United States Patent
Nakagawa et al.

(10) Patent No.: US 9,963,795 B2
(45) Date of Patent: May 8, 2018

(54) GASKET AND ELECTROLYSER

(71) Applicant: ASAHI KASEI KABUSHIKI KAISHA, Tokyo (JP)

(72) Inventors: Kenji Nakagawa, Tokyo (JP); Shinji Hasegawa, Tokyo (JP); Yousuke Uchino, Tokyo (JP); Yasuhide Noaki, Kanagawa (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 14/787,315

(22) PCT Filed: Apr. 23, 2014

(86) PCT No.: PCT/JP2014/061475
§ 371 (c)(1),
(2) Date: Oct. 27, 2015

(87) PCT Pub. No.: WO2014/178317
PCT Pub. Date: Nov. 6, 2014

(65) Prior Publication Data
US 2016/0153100 A1     Jun. 2, 2016

(30) Foreign Application Priority Data

Apr. 30, 2013 (JP) ................................. 2013-095821
Dec. 24, 2013 (JP) ................................. 2013-265405

(51) Int. Cl.
    *C25B 13/02*     (2006.01)
    *C25B 9/08*     (2006.01)
    (Continued)

(52) U.S. Cl.
CPC .......... *C25B 13/02* (2013.01); *C02F 1/46104* (2013.01); *C25B 9/00* (2013.01);
(Continued)

(58) Field of Classification Search
CPC ................................. F16J 15/10; H01M 8/242
(Continued)

(56) References Cited

U.S. PATENT DOCUMENTS 2,189,795 A * 2/1940 Hartbauer .............. B61D 25/00
                                              156/290
2,616,671 A * 11/1952 Wakeman ............... F28F 3/083
                                              165/167

(Continued)

FOREIGN PATENT DOCUMENTS

CN         2600450         1/2004
EP          2 293 371       3/2011
(Continued)

OTHER PUBLICATIONS

International Search Report issued in PCT/JP2014/061475, dated Aug. 5, 2014.
(Continued)

*Primary Examiner* — Harry D Wilkins, III
(74) *Attorney, Agent, or Firm* — Greenblum & Bernstein, P.L.C.

(57) ABSTRACT

Provided are a gasket and an electrolyzer capable of preventing an electrolyte or a gas from leaking from a diaphragm. An annular gasket includes first and second surfaces which respectively contact a frame near a positive electrode and a frame near a negative electrode and a slit portion which is opened inward and is provided in the entire periphery of the gasket so as to accommodate an edge of an ion-permeable diaphragm.

20 Claims, 15 Drawing Sheets

(51) Int. Cl.
*C25B 9/20* (2006.01)
*C02F 1/461* (2006.01)
*C25B 9/00* (2006.01)

(52) U.S. Cl.
CPC ............... *C25B 9/08* (2013.01); *C25B 9/206* (2013.01); *C02F 2201/004* (2013.01); *C02F 2201/46115* (2013.01); *Y02E 60/366* (2013.01)

(58) Field of Classification Search
USPC .......... 165/164–167, DIG. 71; 277/634–654
See application file for complete search history.

(56) References Cited

U.S. PATENT DOCUMENTS

| | | | | |
|---|---|---|---|---|
| 3,061,895 A * | 11/1962 | Kleinhans | ................ | E06B 3/62 277/642 |
| 3,856,611 A * | 12/1974 | Markley | ................... | B32B 3/04 428/76 |
| 4,443,018 A * | 4/1984 | Samol | ................... | F24C 15/021 277/632 |
| 4,752,099 A * | 6/1988 | Roos | ........................ | B60J 7/057 16/95 R |
| 4,892,632 A | 1/1990 | Morris | | |
| 4,898,638 A * | 2/1990 | Lugez | ..................... | B32B 25/08 156/242 |
| 5,161,808 A * | 11/1992 | Walters | .................. | F16J 15/067 277/631 |
| 7,905,038 B2 * | 3/2011 | Coff | ........................ | A47J 41/00 206/459.5 |
| 8,439,191 B1 * | 5/2013 | Lu | ........................ | H04B 1/3888 206/320 |
| 9,077,010 B2 * | 7/2015 | Ueda | ...................... | F16J 15/062 |
| 9,136,897 B2 * | 9/2015 | Hynecek | .............. | H04B 1/3888 |
| 9,634,707 B2 * | 4/2017 | Pan | ........................ | H04B 1/385 |
| 2007/0190390 A1 * | 8/2007 | Kuroki | ................ | F16J 15/0818 429/479 |
| 2009/0165843 A1 * | 7/2009 | Horioka | .................. | H02S 30/10 136/251 |
| 2010/0127126 A1 * | 5/2010 | Lieven | .................. | B64C 1/1492 244/129.3 |
| 2010/0203931 A1 * | 8/2010 | Hynecek | ................ | A45C 11/00 455/575.8 |
| 2010/0289390 A1 * | 11/2010 | Kenney | ................. | B29C 43/006 312/223.1 |
| 2010/0319840 A1 * | 12/2010 | Sadlier | ................... | B65D 41/22 156/212 |
| 2011/0244930 A1 * | 10/2011 | Kong | ................. | G02F 1/133308 455/575.1 |
| 2012/0086176 A1 * | 4/2012 | Kondou | ................. | F16J 15/067 277/631 |
| 2013/0307227 A1 | 11/2013 | Ueda et al. | | |
| 2015/0329977 A1 * | 11/2015 | Blach | ..................... | C25B 15/08 204/276 |
| 2016/0153100 A1 * | 6/2016 | Nakagawa | ................ | C25B 9/08 204/252 |
| 2016/0161001 A1 * | 6/2016 | Jobe | ....................... | F16J 15/061 277/629 |

FOREIGN PATENT DOCUMENTS

| | | |
|---|---|---|
| JP | 52-115781 | 9/1977 |
| JP | 54-153464 | 10/1979 |
| JP | 3-125069 | 12/1991 |
| JP | 2002-332586 | 11/2002 |
| JP | 2008-171615 | 7/2008 |
| JP | 2011-6767 | 1/2011 |
| JP | 2012-215291 | 11/2012 |
| TW | M405439 | 6/2011 |
| TW | 201307709 | 2/2013 |

OTHER PUBLICATIONS

International Preliminary Report on Patentability issued in PCT/JP2014/061475, dated Nov. 12, 2015.

Search Report received in EPO Application No. 14792171.2, dated Jun. 16, 2015.

* cited by examiner

GASKET AND ELECTROLYSER

TECHNICAL FIELD

The present invention relates to a gasket and an electrolyser including the same.

BACKGROUND ART

In an electrolyser disclosed in Patent Literature 1, a plurality of unit cells each obtained by sequentially connecting a gasket, an electrode, a gasket, a diaphragm fixing ring, a diaphragm, and a self frame is disposed, and a negative electrode and a positive electrode are provided at both ends thereof.

CITATION LIST

Patent Literature

Patent Literature 1: JP 2002-332586 A

SUMMARY OF INVENTION

Technical Problem

In the structure disclosed in Patent Literature 1, the diaphragm is disposed between the self frame and the diaphragm fixing ring so that the diaphragm is nipped by the self frame and the diaphragm fixing ring. In this way, in the structure in which the diaphragm is nipped by a pair of members, there is a possibility that an electrolyte or a gas may leak from the end surface of the diaphragm when the diaphragm is a porous membrane.

An object of the invention is to provide a gasket and an electrolyser capable of preventing an electrolyte or a gas from leaking from a diaphragm.

Solution to Problem

According to an aspect of the invention, provided is a gasket which is assembled to an alkaline water electrolyser so as to hold a diaphragm and has a square shape or an annular shape, including: first and second surfaces which respectively contact a frame near a positive electrode and a frame near a negative electrode; a slit portion which is opened inward and accommodates the edge of the diaphragm; and a filling portion which is provided outside the slit portion and does not accommodate the diaphragm, wherein the slit portion and the filling portion are provided in the entire periphery of the gasket.

The gasket includes the slit portion which is opened inward and accommodates the edge of the diaphragm, and the slit portion is provided in the entire periphery of the gasket. Accordingly, the gasket accommodates the edge of the diaphragm inside the slit portion and covers the end surface of the edge of the diaphragm. Thus, the gasket can prevent an electrolyte or a gas from leaking from the end surface of the diaphragm.

In an embodiment, the gasket may have two or more ridge portions which rise on any one surface of the first surface and the second surface, wherein the ridge portions may be provided at one or more positions overlapping the slit portion when viewed from the facing direction between the first surface and the second surface and may be provided at one or more positions of the filling portion not overlapping the slit portion. Accordingly, when the ridge portion of the gasket is locally pressed, the diaphragm which is accommodated in the slit portion is pressed by the gasket at the position corresponding to the ridge portion. Thus, the gasket can more strongly hold the diaphragm.

In an embodiment, a ratio between the slit portion and the filling portion may be 70:30 to 20:80.

In an embodiment, the diaphragm may be an ion-permeable diaphragm.

In an embodiment, the ion-permeable diaphragm may be a porous membrane.

In an embodiment, a reinforcement member may be buried in the gasket. Accordingly, it is possible to suppress the gasket from being crushed when the gasket is nipped and pressed by the frame.

In an embodiment, a protection film may be provided in at least a part of the first surface and the second surface. Accordingly, the gasket can suppress corrosion thereof caused by an electrolyte or a gas, for example, when the electrolyte or the gas has corrosivity. As a result, the maintainability of the gasket can be improved.

In an embodiment, the gasket may have first and second portions which face each other with the slit portion interposed therebetween in the facing direction between the first surface and the second surface, the first portion including the first surface and the second portion including the second surface; and a divided portion which is provided in any one of the first portion and the second portion so as to be opened inward and divides the first portion so that the first surface is continuous to a surface defining the slit portion in the first portion or divides the second portion so that the second surface is continuous to a surface defining the slit portion in the second portion. When the diaphragm is accommodated in the slit portion, the first portion or the second portion can be turned up by the divided portion. Thus, since the passage of the slit portion is enlarged, the diaphragm can be easily accommodated in the slit portion. As a result, the attachment workability of the diaphragm to the gasket can be improved.

In an embodiment, the divided portion may be provided in a corner portion as an intersecting portion of the inner surface of the first portion or the second portion. In this way, when the gasket is provided with the corner portion, the first portion or the second portion can be satisfactorily turned up by providing the divided portion at the corner portion.

In an embodiment, the divided portion may be provided in the first portion or the second portion not provided with the ridge portion. In the gasket, the first surface or the second surface not provided with the ridge portion is stuck to the frame by an adhesive. For that reason, since the divided portion is provided in the first portion or the second portion not provided with the ridge portion, the divided portion is sealed by the adhesive. Thus, it is possible to prevent an electrolyte or a gas from leaking from the divided portion.

In an embodiment, the divided portion may be provided so that a facing area of a surface forming the divided portion becomes larger than a facing area of a surface forming an imaginary divided portion provided linearly in the facing direction between the first surface and the second surface. Accordingly, when the divided portion is sealed after the diaphragm is accommodated in the slit portion, the divided portion can be satisfactorily sealed due to the size of the facing area. Thus, it is possible to prevent an electrolyte or a gas from leaking from the divided portion.

According to another aspect of the invention, provided is an electrolyser including the gasket. Accordingly, the electrolyser can prevent an electrolyte or a gas from leaking from the diaphragm.

According to another aspect of the invention, provided is an electrolyser which obtains oxygen and hydrogen by electrolyzing an electrolyte formed of alkaline solution, including a gasket which holds a diaphragm, wherein the gasket is formed in a square shape or an annular shape and includes first and second surfaces which respectively contact a frame near a positive electrode and a frame near a negative electrode, a slit portion which is opened inward and is provided in the entire periphery of the gasket so as to accommodate the edge of the diaphragm, a filling portion which is provided outside the slit portion and is provided in the entire periphery of the gasket so as not to accommodate the diaphragm, first and second portions which face each other with the slit portion interposed therebetween in the facing direction between the first surface and the second surface, the first portion including the first surface and the second portion including the second surface, and a divided portion which is provided in any one of the first portion and the second portion so as to be opened inward and divides the first portion so that the first surface is continuous to a surface defining the slit portion in the first portion or divides the second portion so that the second surface is continuous to a surface defining the slit portion in the second portion.

The electrolyser includes the gasket which holds the diaphragm. The gasket includes the slit portion which is opened inward and accommodates the edge of the diaphragm, and the slit portion is provided in the entire periphery of the gasket. Accordingly, the gasket accommodates the edge of the diaphragm inside the slit portion and covers the end surface of the edge of the diaphragm. Thus, the gasket can prevent an electrolyte or a gas from leaking from the end surface of the diaphragm. Further, the gasket includes the divided portion which is provided in any one of the first portion and the second portion so as to be opened inward and divides the first portion so that the first surface is continuous to the surface defining the slit portion in the first portion or divides the second portion so that the second surface is continuous to the surface defining the slit portion in the second portion. When the diaphragm is accommodated in the slit portion, the first portion or the second portion can be turned up by the divided portion. Thus, the diaphragm can be easily accommodated in the slit portion. As a result, the attachment workability of the diaphragm to the gasket can be improved.

In an embodiment, the first surface or the second surface of the gasket may be stuck to the frame near the positive electrode or the frame near the negative electrode by an adhesive, and the divided portion may be provided in the first portion or the second portion having a surface to be stuck by the adhesive. Accordingly, since the divided portion is sealed by the adhesive, it is possible to prevent an electrolyte or a gas from leaking from the divided portion.

In an embodiment, the gasket may have two or more ridge portions which rise on any one of the first surface and the second surface not to be stuck by the adhesive, and the ridge portions may be provided at one or more positions overlapping the slit portion when viewed from the facing direction between the first surface and the second surface and may be provided at one or more positions of the filling portion not overlapping the slit portion. In the gasket, the first surface or the second surface not provided with the ridge portion is stuck to the frame by the adhesive. For that reason, since the divided portion is provided in the first portion or the second portion not provided with the ridge portion, the divided portion is sealed by the adhesive. Thus, it is possible to prevent an electrolyte or a gas from leaking from the divided portion.

Advantageous Effects of Invention

According to the invention, it is possible to prevent an electrolyte or a gas from leaking from a diaphragm.

DESCRIPTION OF EMBODIMENTS

Hereinafter, preferred embodiments of the invention will be described with reference to the accompanying drawings. Further, the same reference signs will be given to the same or equivalent components in the description of the drawings, and the repetitive description thereof will not be presented.

First Embodiment

Figure 1:
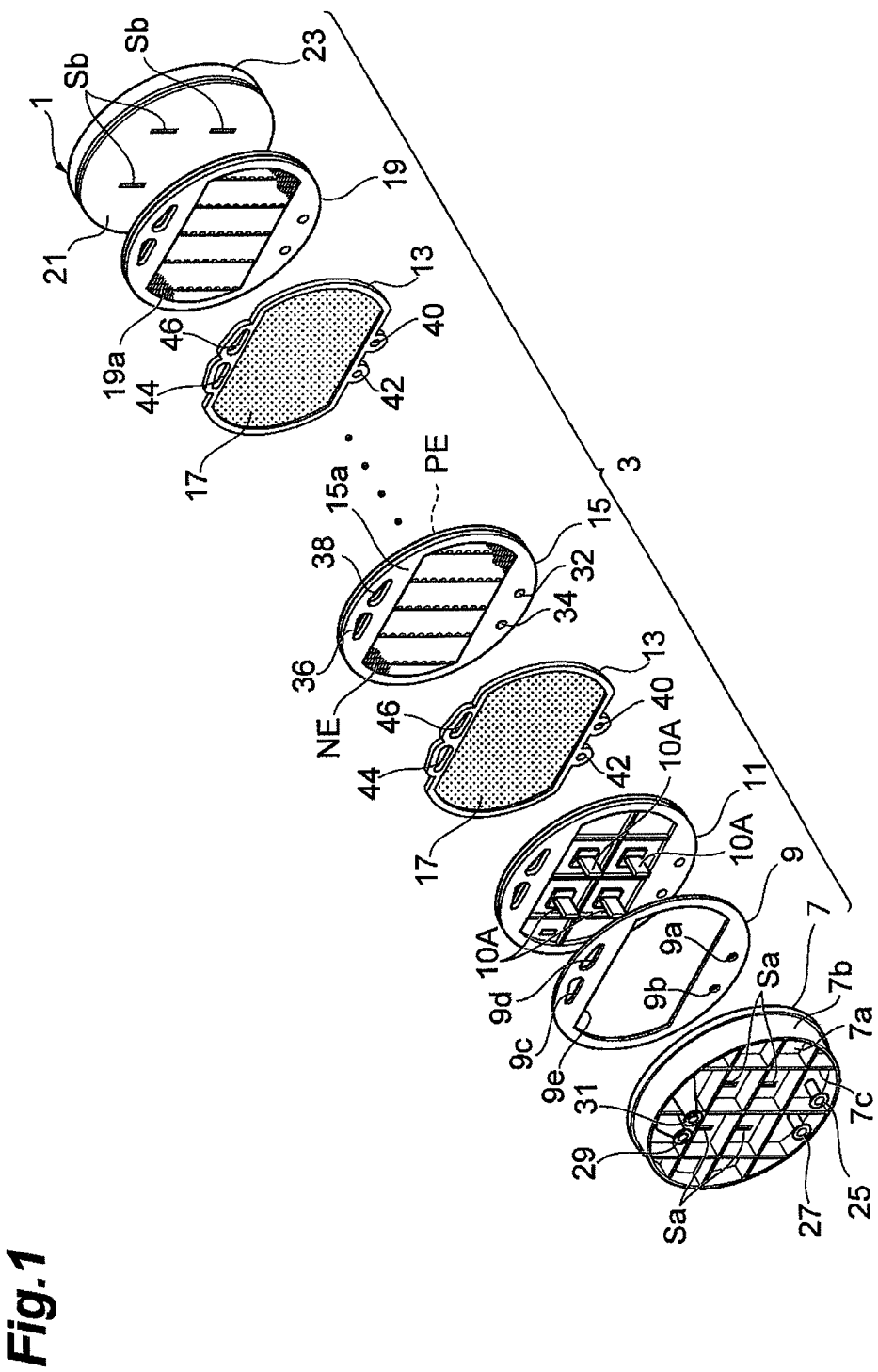
FIG. 1 is a perspective view illustrating the arrangement of members forming an electrolytic cell as a main part of an electrolyser.
Figure 2:
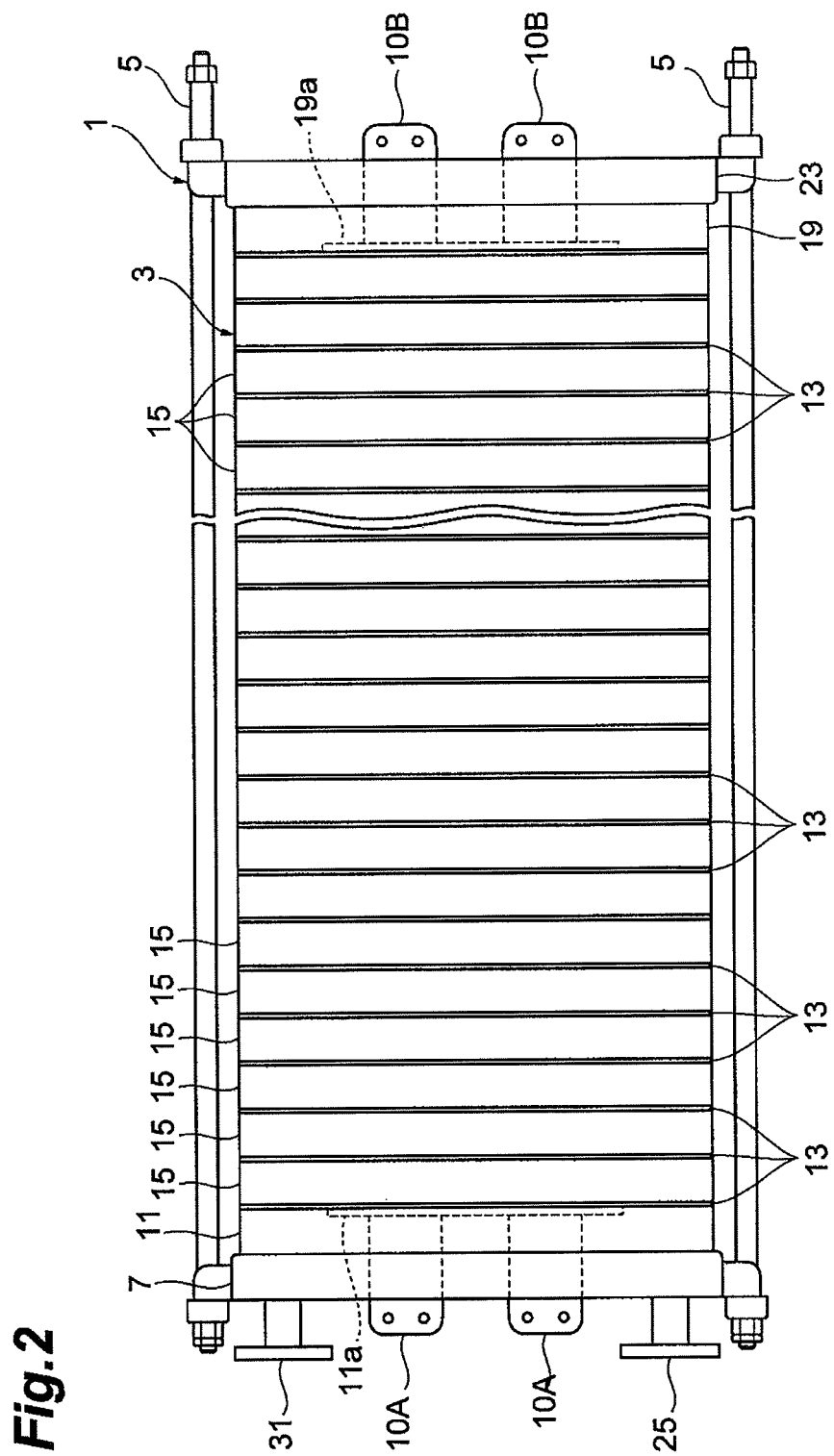
FIG. 2 is a side view illustrating a partially cut electrolyser.

As illustrated in FIGS. 1 and 2, an electrolyser 1 according to an embodiment is a device which obtains oxygen and hydrogen by electrolyzing an electrolyte formed of alkaline water. The electrolyser 1 includes an electrolytic cell 3 which is formed by a plurality of members. The electrolytic cell 3 is clamped by a tie rod 5 (see FIG. 2) so as to integrate the plurality of members.

As illustrated in FIG. 1, the electrolytic cell 3 has a structure in which a press flange 7, a press flange gasket 9, and a positive electrode terminal cell 11 are sequentially lined up from one end side (the left side of the drawing), and then a gasket 13 and a bipolar alkaline water electrolytic cell unit 15 are sequentially lined up. The gasket 13 holds an ion-permeable diaphragm 17. The gasket 13 and the bipolar alkaline water electrolytic cell unit 15 are repeatedly disposed as many as the number required for the planned production amount.

In the electrolytic cell 3, the gasket 13 and the bipolar alkaline water electrolytic cell unit 15 are alternately disposed as many as the required number (see FIG. 1), the gasket 13 is disposed, and then a negative electrode terminal cell 19 with a negative electrode power feed terminal 10B, an insulation plate 21, and an end press flange 23 are sequentially disposed at the other end side. The electrolytic cell 3 is integrated by clamping all constituting members thereof, thereby obtaining the electrolyser 1. The arrangement of the members constituting the electrolytic cell 3 can be arbitrarily selected from the positive electrode or the negative electrode, and the sequence of the embodiment is not limited thereto.

In the press flange 7, an outer frame 7b having a short tube shape is provided along an edge of a cover portion 7a having a disk shape, and a reinforcement rib 7c having a lattice shape is provided in the cover portion 7a. Further, an anolyte inlet nozzle 25, a catholyte inlet nozzle 27, an anolyte/gas outlet nozzle 29, and a catholyte/gas outlet nozzle 31 are provided in the press flange 7 so as to penetrate the cover portion 7a. A slit portion Sa through which a positive electrode power feed terminal 10A is inserted is provided at four positions of the cover portion 7a.

The press flange gasket 9 is provided with a passage hole 9a which communicates with the anolyte inlet nozzle 25, a passage hole 9b which communicates with the catholyte inlet nozzle 27, a passage hole 9c which communicates with the anolyte/gas outlet nozzle 29, and a passage hole 9d which communicates with the catholyte/gas outlet nozzle 31, and is further provided with a hole portion 9e which allows the positive electrode power feed terminals 10A to escape.

The positive electrode terminal cell 11 is provided with four positive electrode power feed terminals 10A which protrude toward the press flange 7 and a positive electrode 11a (see FIG. 2) which is provided near the adjacent gasket 13.

An outer frame (a frame) 15a of the bipolar alkaline water electrolytic cell unit 15 is provided with a passage hole 32 which communicates with the anolyte inlet nozzle 25, a passage hole 34 which communicates with the catholyte inlet nozzle 27, a passage hole 36 which communicates with the anolyte/gas outlet nozzle 29, and a passage hole 38 which communicates with the catholyte/gas outlet nozzle 31.

The negative electrode terminal cell 19 is provided with a negative electrode 19a which is provided near the adjacent gasket 13 and four negative electrode power feed terminals 10B which protrude toward the end press flange 23. A slit portion Sb through which the negative electrode power feed terminal 10B is inserted is provided at four positions of the insulation plate 21 and the end press flange 23.

It is required that the ion-permeable diaphragm 17 has low gas permeability, small conductivity, and strong strength. The diaphragm used for alkaline water electrolysis from the past is asbestos or modified asbestos. However, in recent years, a porous diaphragm using polysulfone-based polymer, a cloth using polyphenylene sulfide fiber, a fluorine-based porous membrane, or a porous member obtained by mixing an inorganic material and an organic material is used. Other than the porous diaphragm, a fluorine-based ion exchange membrane may be used in some cases. In addition, the gasket 13 can hold any kind of diaphragms without any limitation.

Figure 3:
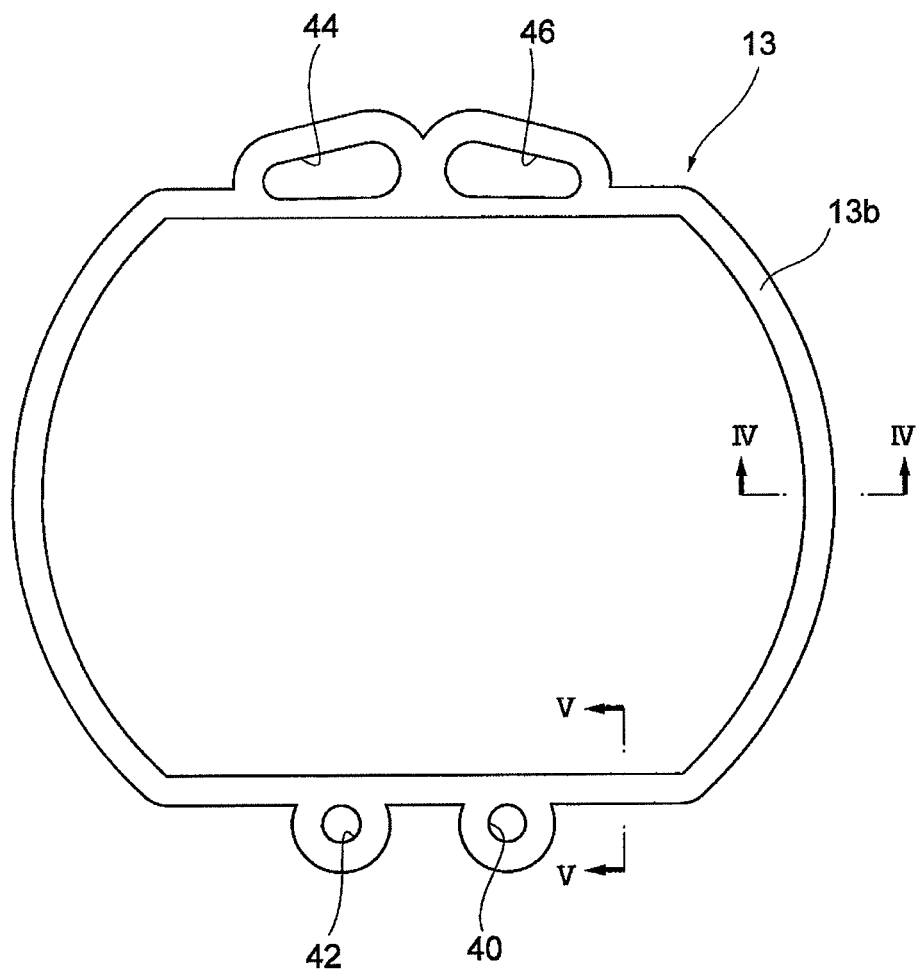
FIG. 3 is a front view illustrating a gasket according to a first embodiment.
Figure 4:
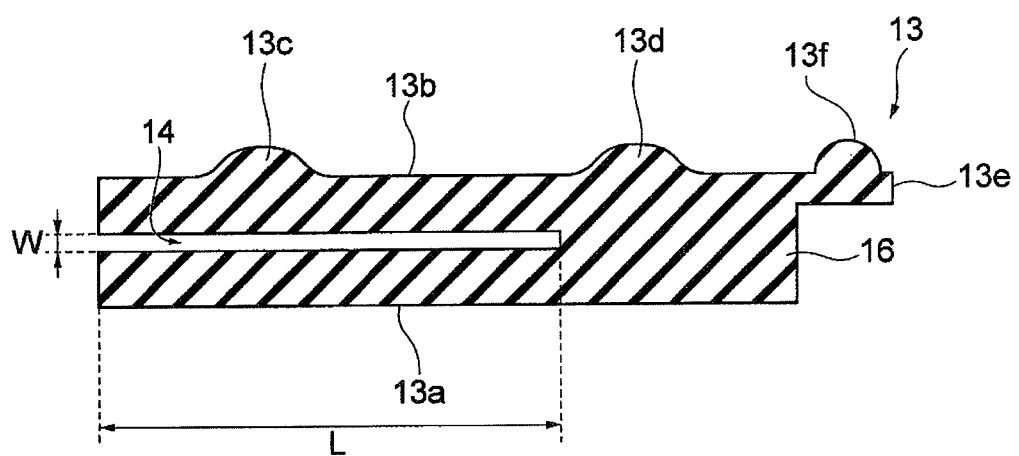
FIG. 4 is a diagram illustrating a cross-sectional structure taken along the line IV-IV of FIG. 3.
Figure 5:
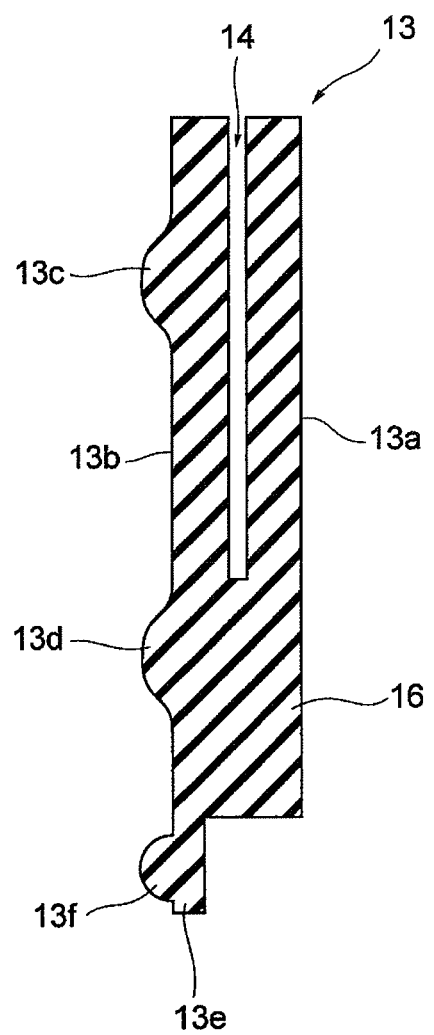
FIG. 5 is a diagram illustrating a cross-sectional structure taken along the line V-V of FIG. 3.

Next, the gasket 13 will be described in detail. FIG. 3 is a front view illustrating the gasket. FIG. 4 is a diagram illustrating a cross-sectional structure taken along the line IV-IV of FIG. 3. FIG. 5 is a diagram illustrating a cross-sectional structure taken along the line V-V of FIG. 3.

As illustrated in FIG. 3, the gasket 13 has an annular shape (a frame shape). It is desirable that the gasket 13 be formed of an alkali-resistant material. As the material of the gasket 13, natural rubber (NR), styrene-butadiene rubber (SBR), chloroprene rubber (CR), butadiene rubber (BR), acrylonitrile-butadiene rubber (NBR), silicone rubbr (SR), ethylene-propylene rubber (EPT), ethylene propylene diene rubber (EPDM), fluorine rubber (FR), isobutylene-isoprene rubber (IIR), urethane rubber (UR), chlorosulfonated polyethylene rubber (CSM), or the like can be used.

As illustrated in FIGS. 4 and 5, the gasket 13 includes a first surface 13a and a second surface 13b. The first surface 13a and the second surface 13b are formed as flat surfaces.

The gasket 13 includes a slit portion 14 and a filling portion 16. The slit portion 14 and the filling portion 16 are provided in the entire periphery of the gasket 13. Specifically, the slit portion 14 is opened to the inside of the gasket 13. The slit portion 14 extends to be substantially parallel to the first surface 13a and the second surface 13b of the gasket 13. The length (depth) L of the slit portion 14 may be appropriately set to a length in which the ion-permeable diaphragm 17 can be held and is, for example, about 3 to 20 mm. The width W of the slit portion 14 may be appropriately set in response to the thickness of the ion-permeable diaphragm 17 and is, for example, about 0.1 to 1.0 mm. In the embodiment, the width of the slit portion 14 is substantially equal to the thickness of the ion-permeable diaphragm 17 and is, for example, about 0.4 mm.

The filling portion 16 is a portion which is provided at the outside of the slit portion 14 and does not accommodate the ion-permeable diaphragm 17. The ratio of the slit portion 14 and the filling portion 16 is, for example, 70:30 to 20:80.

The gasket 13 includes a first ridge portion 13c and a second ridge portion 13d. The first ridge portion 13c and the second ridge portion 13d rise on the second surface 13b. Each cross-section of the first and second ridge portions 13c and 13d may have various shapes such as a triangle and a square. For example, a substantially half circular shape which does not damage the ion-permeable diaphragm 17 is desirable.

The height of the first and second ridge portions 13c and 13d is not particularly limited. However, in order to exhibit a sufficient pressure between the ion-permeable diaphragm 17 and the gasket 13 and between the gasket 13 and the outer frame 15a near the negative electrode NE or the positive electrode PE, the height is desirably in the range of 0.5 mm to 5 mm. The first ridge portion 13c and the second ridge portion 13d extend along the shape of the gasket 13. The first ridge portion 13c and the second ridge portion 13d are disposed with a predetermined gap therebetween.

The first ridge portion 13c is located at the inner edge side of the gasket 13, and is disposed at a position overlapping the slit portion 14 when viewed from the facing direction between the first surface 13a and the second surface 13b. That is, the bottom portion of the slit portion 14 is located at the outer edge side of the gasket 13 in relation to the first ridge portion 13c. The second ridge portion 13d is located at the outer edge side of the gasket 13. In the embodiment, the second ridge portion 13d is located at the filling portion 16, that is, the outer edge side of the gasket 13 in relation to the bottom portion of the slit portion 14.

The first ridge portion 13c and the second ridge portion 13d are respectively used for different purposes. The first ridge portion 13c presses the ion-permeable diaphragm 17 so as to prevent the ion-permeable diaphragm 17 from moving out of the slit portion 14. The second ridge portion 13d appropriately presses the gasket 13 and the outer frame 15a near the negative electrode NE or the positive electrode PE so as to prevent a liquid or a gas from leaking from the inside of the electrolyser 1.

It is desirable that the position of the first ridge portion 13c be near the center of the slit portion 14 in that the ion-permeable diaphragm 17 is appropriately pressed. Specifically, it is desirable to set the position of the first ridge portion 13c so that the ratio between the distance from the opening of the slit portion 14 to the center of the first ridge portion 13c and the distance from the center of the first ridge portion 13c to the bottom portion of the slit portion 14 be 20:80 to 80:20. Accordingly, the misalignment of the film is prevented.

The gasket 13 includes a projection portion 13e. The projection portion 13e is a portion which is projected outward from the outer edge of the gasket 13. The projection portion 13e has a thickness (a dimension between the first surface 13a and the second surface 13b) smaller than the other portion, and includes a step with respect to the first surface 13a. The projection portion 13e is provided with a ridge portion 13f. In addition, the ridge portion 13f may not be provided.

The gasket 13 is provided with a passage hole 40 which communicates with the anolyte inlet nozzle 25, a passage hole 42 which communicates with the catholyte inlet nozzle 27, a passage hole 44 which communicates with the anolyte/gas outlet nozzle 29, and a passage hole 46 which communicates with the catholyte/gas outlet nozzle 31.

Figure 6:
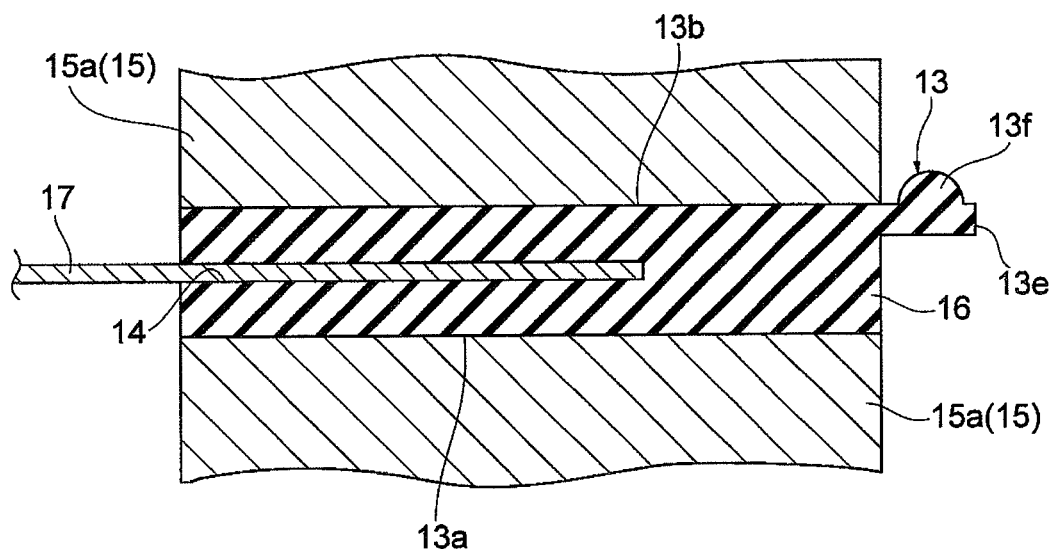
FIG. 6 is a diagram illustrating a cross-sectional structure in which an ion-permeable diaphragm is nipped by the gasket.

As illustrated in FIG. 6, the ion-permeable diaphragm 17 is inserted into the slit portion 14. The gasket 13 is disposed between the outer frames 15a of the bipolar alkaline water electrolytic cell unit 15, and is pressed against the outer frames 15a. Accordingly, the ion-permeable diaphragm 17 is pressed against the gasket 13 and is nipped by the gasket 13.

Next, an example of an attachment method for the gasket 13 will be described. In the description below, an example of a method of attaching the gasket 13 to the bipolar alkaline water electrolytic cell unit 15 will be described. First, an adhesive is applied to the first surface 13a of the gasket 13. Next, the second surface 13b of the gasket 13 is stuck to the outer frame 15a near the positive electrode PE in the bipolar alkaline water electrolytic cell unit 15. In addition, it is desirable to pour water to the positive electrode PE of the bipolar alkaline water electrolytic cell unit 15 so that the positive electrode gets wet after the adhesive is dried.

Subsequently, the ion-permeable diaphragm 17 cut into a predetermined size (a size larger than the opening of the gasket 13) is prepared. Next, the outer edge of the ion-permeable diaphragm 17 is inserted into the slit portion 14 of the gasket 13. At this time, when the ion-permeable diaphragm 17 is wrinkled, water is sprayed to the ion-permeable diaphragm 17 so as to stretch the wrinkle.

After the ion-permeable diaphragm 17 is attached to the gasket 13, another bipolar alkaline water electrolytic cell unit 15 is prepared, and the bipolar alkaline water electrolytic cell unit 15 is stacked so that the outer frame 15a at the negative electrode NE in the bipolar alkaline water electrolytic cell unit 15 faces the gasket 13. With the above-described procedure, the gasket 13 is attached.

As described above, the slit portion 14 is provided in the gasket 13 of the embodiment. Accordingly, the gasket 13 covers the end surface of the ion-permeable diaphragm 17 by accommodating the edge of the ion-permeable diaphragm 17 inside the slit portion 14. Thus, it is possible to prevent an electrolyte or a gas from leaking from the end surface of the ion-permeable diaphragm 17 in the gasket 13.

In the embodiment, the gasket 13 includes the first ridge portion 13c. The first ridge portion 13c is disposed at a position overlapping the slit portion 14 when viewed from the facing direction between the first surface 13a and the second surface 13b. Accordingly, the first ridge portion 13c is locally pressed, for example, when the gasket 13 is pressed against the outer frame 15a of the bipolar alkaline water electrolytic cell unit 15. Accordingly, since the ion-permeable diaphragm 17 disposed at a position corresponding to the first ridge portion 13c in the gasket 13 is pressed, the ion-permeable diaphragm 17 can be strongly held.

In the embodiment, the gasket 13 includes the projection portion 13e. Accordingly, in the electrolyser 1, the projection portion 13e is projected outward in relation to the outer edge of the outer frame 15a, for example, when the gasket is disposed between the pair of bipolar alkaline water electrolytic cell units 15 as illustrated in FIG. 6. Thus, in the electrolyser 1, the short-circuit between the pair of bipolar alkaline water electrolytic cell units 115 can be prevented.

In addition to the above-described embodiment, the gasket 13 may be provided with a reinforcement member. The reinforcement member is buried (embedded) in, for example, the gasket 13. As the reinforcement member, a cloth obtained by weaving a string of stainless steel, nylon, polypropylene, PVDF, PTFE, or PPS or short fibers thereof can be used. Accordingly, the gasket is not easily crushed when the gasket is pressed between the outer frames 15a.

In addition to the above-described embodiment, the surface of the gasket 13 may be processed. As an example of the processing, a protection film can be provided on the surface of the gasket 13. As the protection film, for example, a tape of polytetrafluoroethylene (PTFE) can be used. The protection film may be provided so as to cover at least the first ridge portion 13c from the inside of the second surface 13b. Accordingly, the durability of the gasket 13 with respect to an electrolyte or a gas having corrosivity can be improved. As a result, the maintainability of the gasket can be improved.

Figure 7:
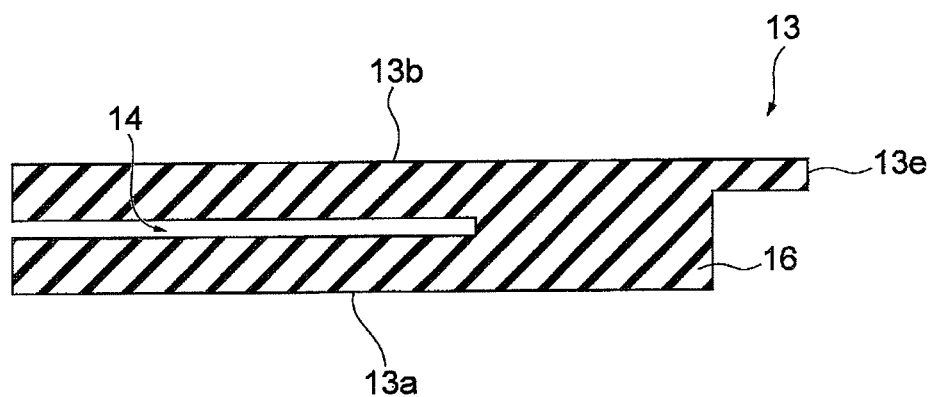
FIG. 7 is a diagram illustrating a cross-sectional structure of a gasket according to another embodiment.

In the above-described embodiment, a structure has been described in which the first ridge portion 13c and the second ridge portion 13d are provided in the second surface 13b of the gasket 13 and the ridge portion 13f is provided in the projection portion 13e, but as illustrated in FIG. 7, the ridge portion may not be provided. In addition, it is desirable that the ridge portion be provided in the gasket.

Figure 8:
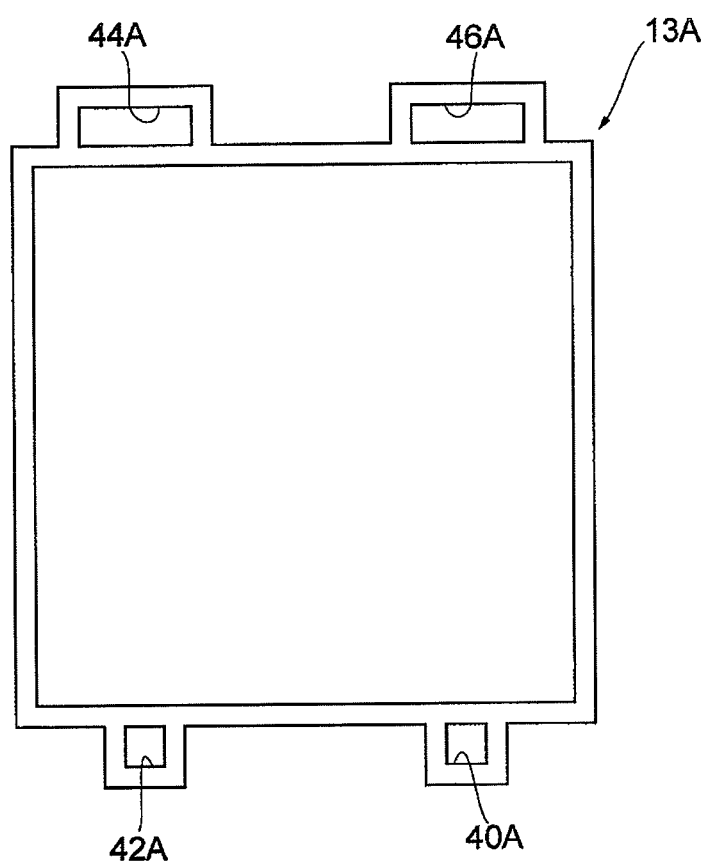
FIG. 8 is a front view illustrating a gasket according to a modified example of the first embodiment.

Further, the gasket may have a structure illustrated in FIG. 8. FIG. 8 is a front view illustrating a gasket according to another embodiment. As illustrated in FIG. 8, a gasket 13A has a substantially rectangular shape (square shape). The gasket 13A is provided with a passage hole 40A which communicates with the anolyte inlet nozzle 25, a passage hole 42A which communicates with the catholyte inlet nozzle 27, a passage hole 44A which communicates with the anolyte/gas outlet nozzle 29, and a passage hole 46A which communicates with the catholyte/gas outlet nozzle 31. Each of the passage holes 40A, 42A, 44A, and 46A has a substantially square shape. In addition, the outer shape of the gasket is not particularly limited. Further, the gasket 13A may be provided with the ridge portion or may not be provided with the ridge portion.

Second Embodiment

Figure 9:
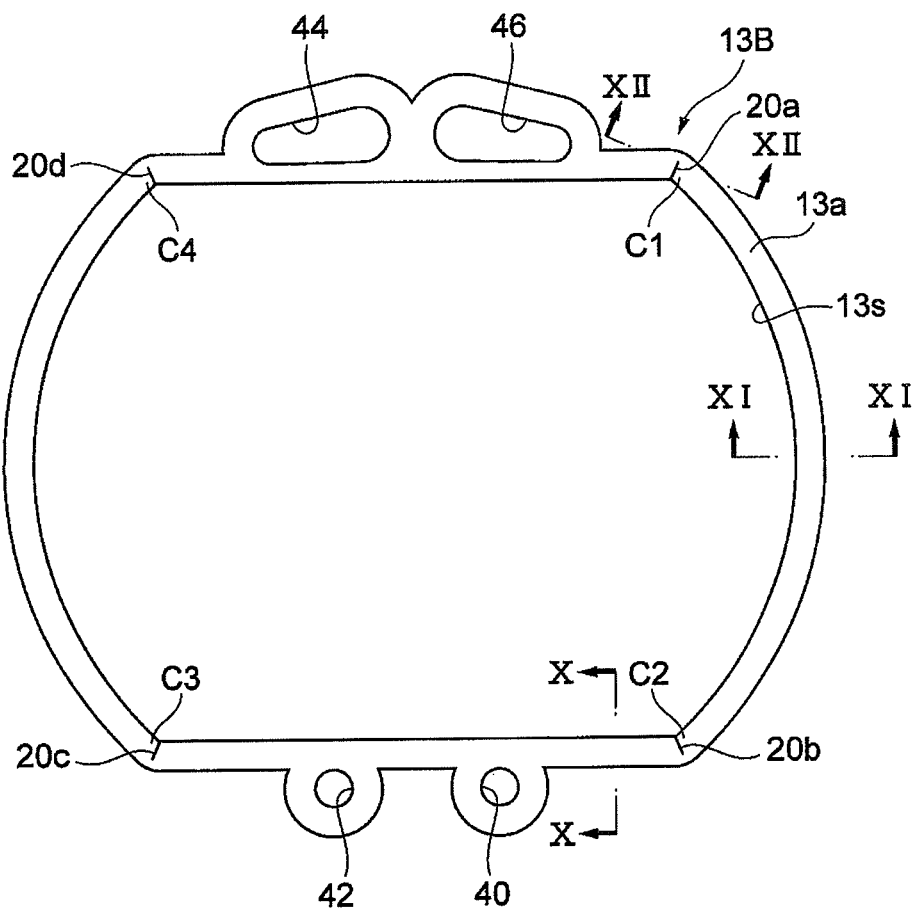
FIG. 9 is a front view illustrating a gasket according to a second embodiment.
Figure 10:
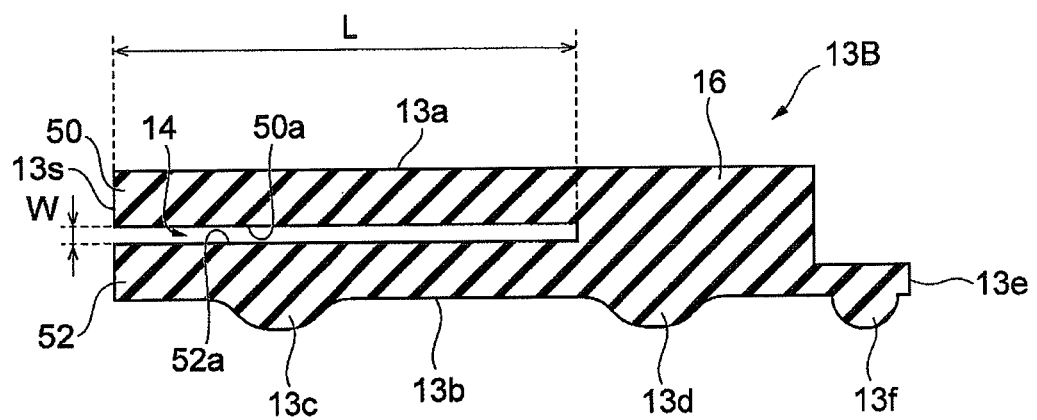
FIG. 10 is a diagram illustrating a cross-sectional structure taken along the line X-X of FIG. 9.
Figure 11:
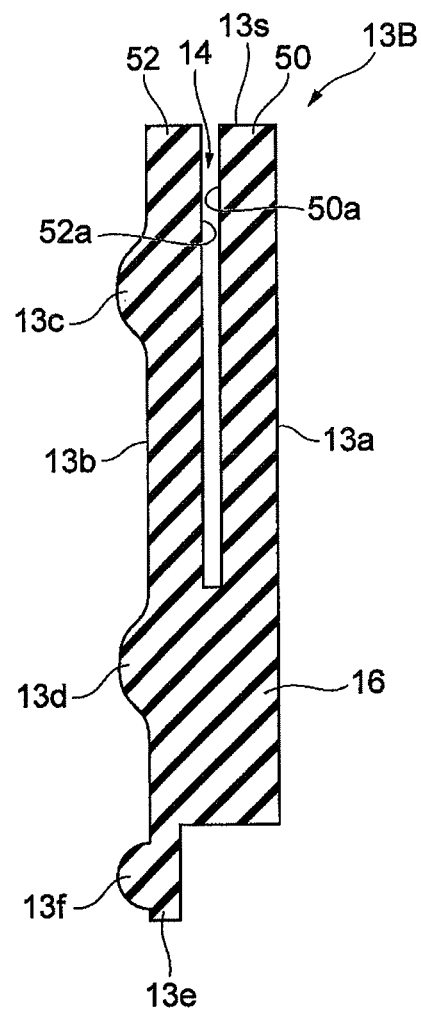
FIG. 11 is a diagram illustrating a cross-sectional structure taken along the line XI-XI of FIG. 9.
Figure 12:
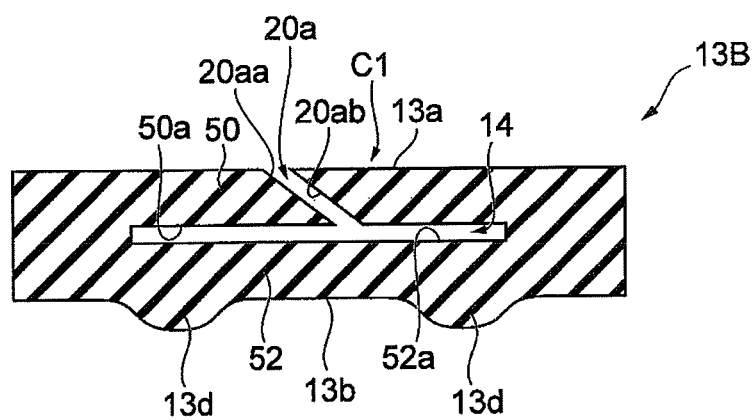
FIG. 12 is a diagram illustrating a cross-sectional structure taken along the line XII-XII of FIG. 9.

Next, a second embodiment will be described. FIG. 9 is a front view illustrating a gasket according to the second embodiment. FIG. 10 is a diagram illustrating a cross-sectional structure taken along the line X-X of FIG. 9. FIG. 11 is a diagram illustrating a cross-sectional structure taken along the line XI-XI of FIG. 9. FIG. 12 is a diagram illustrating a cross-sectional structure taken along the line XII-XII of FIG. 9.

As illustrated in FIGS. 10 and 11, a gasket 13B includes a first surface 13a and a second surface 13b. The first surface 13a and the second surface 13b are formed as flat surfaces.

The gasket 13B includes a slit portion 14 and a filling portion 16. The slit portion 14 is provided in the entire periphery of the gasket 13B. Specifically, the slit portion 14 is opened to the inside of the gasket 13B. The slit portion 14 is defined by a surface 50a of a first portion 50 having the first surface 13a and a surface 52a of a second portion 52 having the second surface 13b. The surface 50a and the surface 52a face each other. That is, the first portion 50 and the second portion 52 face each other with the slit portion 14 interposed therebetween in the facing direction between the first surface 13a and the second surface 13b.

The slit portion 14 extends so as to be substantially parallel to the first surface 13a and the second surface 13b of the gasket 13B. The length (depth) L of the slit portion 14 may be appropriately set to a length in which the ion-permeable diaphragm 17 can be held and is, for example, about 3 to 20 mm. The width W of the slit portion 14 may be appropriately set in response to the thickness of the ion-permeable diaphragm 17 and is, for example, about 0.1 to 1.0 mm. In the embodiment, the width of the slit portion 14 is substantially equal to the thickness of the ion-permeable diaphragm 17 and is, for example, about 0.4 mm.

As illustrated in FIGS. 9 and 12, the gasket 13B includes divided portions 20a, 20b, 20c, and 20d. The divided portions 20a to 20d are respectively provided at corner portions C1, C2, C3, and C4 of the gasket 13B. Each of the corner portions C1 to C4 is an intersecting portion of an inner surface 13s of the first portion 50 (the second portion 52). The divided portions 20a to 20d have the same configuration. Hereinafter, the divided portion 20a will be described as an example.

The divided portion 20a divides a part of the first portion 50 having an annular shape. Specifically, the divided portion 20a is provided so as to be opened to the inside of the first portion 50, and divides the first portion 50 so that the first surface 13a is continuous to the surface 50a defining the slit portion 14 in the first portion 50. As illustrated in FIG. 12, the divided portion 20a is provided so as to be inclined with respect to the first surface 13a. Accordingly, the divided portion 20a is formed so that a facing area of a surface 20aa and a surface 20ab forming the divided portion 20a becomes larger than a facing area of a surface of an imaginary divided portion when the imaginary divided portion is provided linearly in the facing direction between the first surface 13a and the second surface 13b. In addition, in FIG. 12, it is depicted that a gap between the surface 20aa and the surface 20ab of the divided portion 20a is substantially equal to the slit portion 14, but a gap between the surface 20aa and the surface 20ab may be smaller than the slit portion.

Since the gasket 13B is provided with the divided portion 20a, the first portion 50 can be turned up. Specifically, when the first portion 50 is turned up so as to be separated from the second portion 52 in the gasket 13B, the first portion 50 is turned up from the divided portion 20a as a start point. Accordingly, since the opening of the slit portion 14 is widened in the gasket 13B, the edge of the ion-permeable diaphragm 17 can be easily accommodated.

As illustrated in FIGS. 10 and 11, the gasket 13B includes a first ridge portion 13c and a second ridge portion 13d. The first ridge portion 13c and the second ridge portion 13d rise on the second surface 13b. That is, the first ridge portion 13c and the second ridge portion 13d are provided at the second portion 52 instead of the first portion 50 provided with the divided portions 20a to 20d. Each cross-section of the first and second ridge portions 13c and 13d may have various shapes such as a triangle and a square. However, it is desirable that the cross-section be, for example, substantially semi-circular so that the ion-permeable diaphragm 17 is not damaged.

The height of the first and second ridge portions 13c and 13d is not particularly limited. However, in order to exhibit a sufficient pressure between the ion-permeable diaphragm 17 and the gasket 13B and between the gasket 13B and the outer frame 15a near the negative electrode NE or the positive electrode PE, the height is desirably in the range of 0.5 mm to 5 mm. The first ridge portion 13c and the second ridge portion 13d extend along the shape of the gasket 13B. The first ridge portion 13c and the second ridge portion 13d are disposed with a predetermined gap therebetween.

The first ridge portion 13c is located at the inner edge side of the gasket 13B, and is disposed at a position overlapping the slit portion 14 when viewed from the facing direction between the first surface 13a and the second surface 13b. That is, the bottom portion of the slit portion 14 is located at the outer edge side of the gasket 13B in relation to the first ridge portion 13c. The second ridge portion 13d is located at the outer edge side of the gasket 13B. In the embodiment, the second ridge portion 13d is located at the filling portion 16, that is, the outer edge side of the gasket 13B in relation to the bottom portion of the slit portion 14.

The first ridge portion 13c and the second ridge portion 13d are respectively used for different purposes. The first ridge portion 13c presses the ion-permeable diaphragm 17 so as to prevent the ion-permeable diaphragm 17 from moving out of the slit portion 14. Further, the first ridge portion 13c prevents an oxygen gas or a hydrogen gas passing through the bottom portion of the slit portion 14 from a gap between the ion-permeable diaphragm 17 and the surface 50a (the surface 52a) of the first portion 50 (the second portion 52) and passing through the ion-permeable diaphragm 17 and the surface 52a (the surface 50a) of the second portion 52 (the first portion 50) from being mixed inside the electrolyser 1. The second ridge portion 13d appropriately presses the gasket 13B and the outer frame 15a near the negative electrode NE or the positive electrode PE so as to prevent a liquid or a gas from leaking from the inside of the electrolyser 1.

It is desirable that the position of the first ridge portion 13c be near the center of the slit portion 14 in that the ion-permeable diaphragm 17 is appropriately pressed. Specifically, it is desirable to set the position of the first ridge portion 13c so that the ratio between the distance from the opening of the slit portion 14 to the center of the first ridge portion 13c and the distance from the center of the first ridge portion 13c to the bottom portion of the slit portion 14 be 20:80 to 80:20. Accordingly, the misalignment of the film is prevented.

The gasket 13B includes a projection portion 13e. The projection portion 13e is a portion which is projected outward from the outer edge of the gasket 13B. The projection portion 13e has a thickness (a dimension between the first surface 13a and the second surface 13b) smaller than the other portion, and includes a step with respect to the first surface 13a. The projection portion 13e is provided with a ridge portion 13f. In addition, the ridge portion 13f may not be provided.

The gasket 13B is provided with a passage hole 40 which communicates with the anolyte inlet nozzle 25, a passage hole 42 which communicates with the catholyte inlet nozzle 27, a passage hole 44 which communicates with the anolyte/gas outlet nozzle 29, and a passage hole 46 which communicates with the catholyte/gas outlet nozzle 31.

Figure 13:
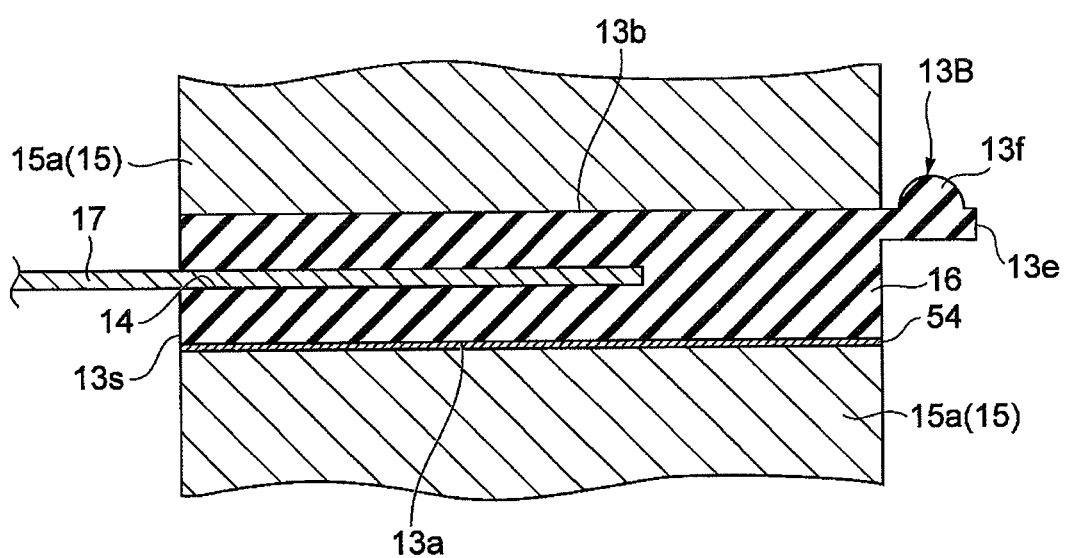
FIG. 13 is a diagram illustrating a cross-sectional structure in which an ion-permeable diaphragm is nipped by the gasket.

As illustrated in FIG. 13, the ion-permeable diaphragm 17 is inserted into the slit portion 14. The gasket 13B is disposed between the outer frames 15a of the bipolar alkaline water electrolytic cell unit 15, and is pressed against the outer frames 15a. Accordingly, the ion-permeable diaphragm 17 is pressed against the gasket 13B and is nipped by the gasket 13B.

Next, an example of an attachment method of the gasket 13B will be described. In the description below, an example of a method of attaching the gasket 13B to the bipolar alkaline water electrolytic cell unit 15 will be described. First, the ion-permeable diaphragm 17 cut into a predetermined size (a size larger than the opening of the gasket 13B) is prepared. Next, the cut ion-permeable diaphragm 17 is inserted into the slit portion 14 of the gasket 13B while the first portion 50 is raised in a direction separated from the second portion 52 so as to enlarge the passage of the slit portion 14. At this time, when the ion-permeable diaphragm 17 is wrinkled, water is sprayed to the ion-permeable diaphragm 17 so as to stretch the wrinkles.

Subsequently, the water of the surfaces 20aa and 20ab of the divided portions 20a to 20d is wiped out, an adhesive is applied to the surfaces 20aa and 20ab, and the surface 20aa and the surface 20ab are stuck to each other, so that the divided portions 20a to 20d are sealed. Next, the water of the first surface 13a of the gasket 13B is wiped out, and an adhesive 54 (see FIG. 13) is applied to the surface. Next, the first surface 13a of the gasket 13B is stuck to the outer frame 15a at the positive electrode PE of the bipolar alkaline water electrolytic cell unit 15. In addition, it is desirable to moisten the positive electrode by spraying water to the positive electrode PE of the bipolar alkaline water electrolytic cell unit 15 after the adhesive 54 is dried.

Next, another bipolar alkaline water electrolytic cell unit 15 is prepared, and the bipolar alkaline water electrolytic cell unit 15 is stacked so that the outer frame 15a at the negative electrode NE in the bipolar alkaline water electrolytic cell unit 15 faces the gasket 13B. With the above-described procedure, the gasket 13B is attached.

As described above, the slit portion 14 which is opened inward and accommodates the edge of the ion-permeable diaphragm 17 is provided in the entire edge of the gasket 13B of the electrolyser 1. Accordingly, the gasket 13B accommodates the edge of the ion-permeable diaphragm 17 inside the slit portion 14 and covers the end surface of the edge of the ion-permeable diaphragm 17. Thus, the gasket 13B can prevent an electrolyte or a gas from leaking from the end surface of the ion-permeable diaphragm 17. Further, the gasket 13B includes the divided portions 20a to 20d which are provided so as to be opened to the inside of the first portion 50 and divides the first portion 50 so that the first surface 13a is continuous to the surface 50a defining the slit portion 14 of the first portion 50. The first portion 50 can be turned up by the divided portions 20a to 20d when the ion-permeable diaphragm 17 is accommodated in the slit portion 14. Thus, since the passage of the slit portion 14 is enlarged, the ion-permeable diaphragm 17 can be easily accommodated in the slit portion 14. As a result, the ion-permeable diaphragm 17 can be easily attached to the gasket 13B.

In the embodiment, the divided portions 20a to 20d are respectively provided in the corner portions C1 to C4 as the intersecting portions of the inner surface 13s of the first portion 50. In this way, since the divided portions 20a to 20d are provided in the corner portions C1 to C4, the first portion 50 can be satisfactorily turned up.

In the embodiment, the gasket 13B includes the first ridge portion 13c and the second ridge portion 13d which rise on the second surface 13b, and the first ridge portion 13c is disposed at a position overlapping the slit portion 14 when viewed from the facing direction between the first surface 13a and the second surface 13b. Accordingly, when the first ridge portion 13c is locally pressed in the gasket 13B, the ion-permeable diaphragm 17 accommodated in the slit portion 14 is pressed by the gasket 13B at a position corresponding to the first ridge portion 13c. Thus, the gasket 13B can more strongly hold the ion-permeable diaphragm 17.

In the embodiment, the divided portions 20a to 20d are provided in the first portion 50 not provided with the first ridge portion 13c and the second ridge portion 13d. In the gasket 13B, the first surface 13a not provided with the first ridge portion 13c and the second ridge portion 13d is stuck to the outer frame 15a by the adhesive 54. For that reason, when the divided portions 20a to 20d are provided in the first portion 50 not provided with the first ridge portion 13c and the second ridge portion 13d, the divided portions 20a to 20d are sealed by the adhesive 54. Thus, it is possible to prevent an electrolyte or a gas from leaking from the divided portions 20a to 20d.

In the embodiment, the divided portions 20a to 20d are formed so that the facing area of the surfaces 20aa and 20ab forming the divided portions 20a to 20d becomes larger than the facing area of the surface forming the imaginary divided portion provided linearly in the facing direction between the first surface 13a and the second surface 13b. Accordingly, when the divided portions 20a to 20d are sealed after the ion-permeable diaphragm 17 is accommodated in the slit portion 14, the divided portions 20a to 20d can be satisfactorily sealed due to the large facing area. Thus, it is possible to prevent an electrolyte or a gas from leaking from the divided portions 20a to 20d.

Figure 14:
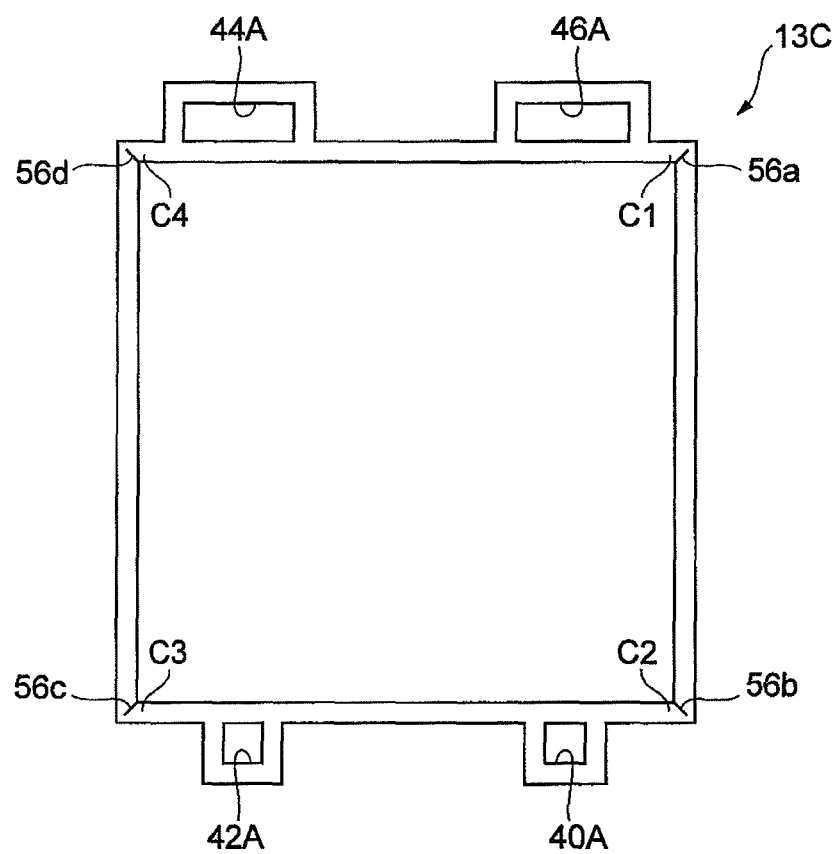
FIG. 14 is a front view illustrating a gasket according to a modified example of the second embodiment.

The gasket may have a structure illustrated in FIG. 14. FIG. 14 is a front view illustrating a gasket according to a modified example of the second embodiment. As illustrated in FIG. 14, a gasket 13C has a substantially rectangular shape in appearance. The gasket 13C is provided with a passage hole 40A which communicates with the anolyte inlet nozzle 25, a passage hole 42A which communicates with the catholyte inlet nozzle 27, a passage hole 44A which communicates with the anolyte/gas outlet nozzle 29, and a passage hole 46A which communicates with the catholyte/gas outlet nozzle 31. Each of the passage holes 40A, 42A, 44A, and 46A has a substantially rectangular shape. In addition, the outer shape of the gasket is not particularly limited. Further, the gasket 13C may be provided with the ridge portion or may not be provided with the ridge portion. In the gasket 13C, divided portions 56a, 56b, 56c, and 56d are respectively provided in the corner portions C1 to C4.

Figure 15:
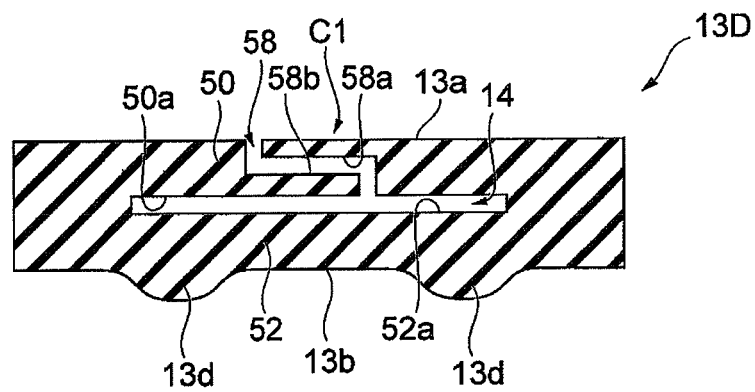
FIG. 15 is a diagram illustrating a cross-sectional structure of the gasket according to the modified example of the second embodiment.

In the above-described embodiment, as illustrated in FIG. 12, an exemplary shape has been described in which the cross-sectional shapes of the divided portions 20a to 20d of the gasket 13B are inclined, but the shape of the divided portion is not limited thereto. FIG. 15 is a diagram illustrating a cross-sectional structure of a gasket according to a modified example of the second embodiment. As illustrated in FIG. 15, a cross-sectional shape of a divided portion 58 of a gasket 13D is a step shape. With such a structure, the divided portion 58 is formed so that the facing area of the surface 58*a* and the surface 58*b* forming the divided portion 58 becomes larger than the facing area of the surface of the imaginary divided portion which is provided linearly in the facing direction between the first surface 13*a* and the second surface 13*b*. In brief, the divided portion may be provided so that the facing area of the surface forming the divided portion becomes larger than the facing area of the surface forming the imaginary divided portion which is provided linearly in the facing direction between the first surface 13*a* and the second surface 13*b*.

In the above-described embodiments, an exemplary structure has been described in which the divided portion is provided in each corner portion of the gasket, but the divided portion may be provided at any position of the first portion or the second portion of the gasket. Further, the number of the divided portions may be appropriately set in response to the design.

In the above-described embodiments, an exemplary structure has been described in which the divided portion is provided in the first portion, but the divided portion may be provided in the second portion.

REFERENCE SIGNS LIST

1: electrolyser
13, 13A, 13B, 13C, 13D: gasket
13*a*: first surface
13*b*: second surface
13*c*: first ridge portion
13*s*: surface
14: slit portion
15*a*: outer frame (frame)
16: filling portion
17: ion-permeable diaphragm (diaphragm)
20*a* to 20*d*, 56*a* to 56*d*: divided portion
50: first portion
50*a*: surface
52: second portion
52*a*: surface
54: adhesive
C1 to C4: corner portion
PE: positive electrode
NE: negative electrode

The invention claimed is:

1. A gasket which is assembled to an alkaline water electrolyser so as to hold a diaphragm and has a square shape or an annular shape, comprising:
first and second surfaces which respectively contact a frame near a positive electrode and a frame near a negative electrode;
a slit portion which is opened inward and accommodates the edge of the diaphragm; and
a filling portion which is provided outside the slit portion and does not accommodate the diaphragm,
first and second portions which face each other with the slit portion interposed therebetween in the facing direction between the first surface and the second surface, the first portion including the first surface and the second portion including the second surface; and
a divided portion which is provided in any one of the first portion and the second portion so as to be opened inward and divides the first portion so that the first surface is continuous to a surface defining the slit portion in the first portion or divides the second portion so that the second surface is continuous to a surface defining the slit portion in the second portion,
wherein the slit portion and the filling portion are provided in the entire periphery of the gasket, and
wherein a ratio of the length of the slit portion in the radial direction to the length of the filling portion in the radial direction is 70:30 to 20:80.

2. The gasket according to claim 1, further comprising:
two or more ridge portions which rise on any one surface of the first surface and the second surface,
wherein the ridge portions are provided at one or more positions overlapping the slit portion when viewed from the facing direction between the first surface and the second surface and are provided at one or more positions of the filling portion not overlapping the slit portion.

3. The gasket according to claim 2,
wherein the divided portion is provided in the first portion or the second portion not provided with the ridge portion.

4. The gasket according to claim 1,
wherein the diaphragm is an ion-permeable diaphragm.

5. The gasket according to claim 4,
wherein the ion-permeable diaphragm is a porous membrane.

6. The gasket according to claim 1,
wherein a reinforcement member is buried in the gasket.

7. The gasket according to claim 1,
wherein a protection film is provided in at least a part of the first surface and the second surface.

8. The gasket according to claim 1,
wherein the divided portion is provided in a corner portion as an intersecting portion of the inner surface of the first portion or the second portion.

9. The gasket according to claim 1,
wherein the divided portion is formed so that a facing area of a surface forming the divided portion becomes larger than a facing area of a surface forming an imaginary divided portion provided linearly in the facing direction between the first surface and the second surface.

10. An electrolyser comprising:
a diaphragm, and
a gasket comprising:
first and second surfaces which respectively contact a frame near a positive electrode and a frame near a negative electrode;
a slit portion which is opened inward and accommodates the edge of the diaphragm;
a filling portion which is provided outside the slit portion and does not accommodate the diaphragm,
first and second portions which face each other with the slit portion interposed therebetween in the facing direction between the first surface and the second surface, the first portion including the first surface and the second portion including the second surface; and
a divided portion which is provided in any one of the first portion and the second portion so as to be opened inward and divides the first portion so that the first surface is continuous to a surface defining the slit portion in the first portion or divides the second portion so that the second surface is continuous to a surface defining the slit portion in the second portion,
wherein the slit portion and the filling portion are provided in the entire periphery of the gasket.

11. The electrolyser according to claim 10,
wherein the first surface or the second surface of the gasket is stuck to the frame near the positive electrode or the frame near the negative electrode by an adhesive, and
wherein the divided portion is provided in the first portion or the second portion having a surface to be stuck by the adhesive.

12. The electrolyser according to claim 11,
wherein the gasket has two or more ridge portions which rise on any one of the first surface and the second surface not to be stuck by the adhesive, and further
wherein the ridge portions are provided at one or more positions overlapping the slit portion when viewed from the facing direction between the first surface and the second surface and are provided at one or more positions of the filling portion not overlapping the slit portion.

13. The electrolyser according to claim 10, wherein the second portion provides a continuous and undivided surface against which the diaphragm is placed.

14. The electrolyser according to claim 10, wherein a ratio of the length of the slit portion in the radial direction to the length of the filling portion in the radial direction is 70:30 to 20:80.

15. The electrolyser according to claim 10, wherein a length of the slit portion extends in a direction from an inner surface of the first portion to the filling portion, wherein the first surface of the first portion is located adjacent to the inner surface of the first portion, and wherein a thickness of the first portion defined as a distance between the first surface and the slit portion is less than a width of the filling portion in a width direction of the slit portion.

16. A gasket for an alkaline water electrolyser comprising:
a filling portion which forms a continuous and undivided portion of an entire periphery of the gasket;
a first portion which is provided inside the filling portion;
a second portion which is also provided inside the filling portion;
a slit portion formed between the first portion and the second portion to hold a diaphragm; and
a plurality of divided portions which are provided in the first portion, wherein the plurality of divided portions are configured to allow for insertion of an edge of the diaphragm.

17. The gasket according to claim 16, wherein the slit portion is provided along the entire periphery of the gasket, and wherein the second portion provides a continuous and undivided surface against which the diaphragm is placed.

18. The gasket according to claim 16,
wherein a ratio of the length of the slit portion in the radial direction to the length of the filling portion in the radial direction is 70:30 to 20:80.

19. The gasket according to claim 16, wherein a length of the slit portion extends in a direction from an inner surface of the first portion to the filling portion, wherein a first surface of the first portion is located adjacent to the inner surface of the first portion, and wherein a thickness of the first portion defined as a distance between the first surface and the slit portion is less than a width of the filling portion in a width direction of the slit portion.

20. The gasket according to claim 16, wherein the second portion does not include any divided portions.

* * * * *